United States Patent
Wilkins et al.

(10) Patent No.: US 12,385,566 B1
(45) Date of Patent: Aug. 12, 2025

(54) SEAL WITH AXIAL AIR VENTS

(71) Applicant: AKTIEBOLAGET SKF, Gothenburg (SE)

(72) Inventors: John Arthur Wilkins, Chicago, IL (US); Daniel J Levy, Arlington Heights, IL (US); Anand Santosh, Livonia, MI (US); David Dobbs, Troy, MI (US)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 18/422,233

(22) Filed: Jan. 25, 2024

(51) Int. Cl.
  *F16J 15/3236* (2016.01)
  *F16J 15/3252* (2016.01)
  *F16J 15/3268* (2016.01)

(52) U.S. Cl.
  CPC ....... *F16J 15/3236* (2013.01); *F16J 15/3252* (2013.01); *F16J 15/3268* (2013.01)

(58) Field of Classification Search
  CPC .. F16J 15/3232; F16J 15/3236; F16J 15/3248; F16J 15/3252; F16J 15/3256; F16J 15/3268; F16J 15/3272; F16J 15/3404; F16J 3/046
  USPC ........................................................ 277/345
  See application file for complete search history.

(56) References Cited

U.S. PATENT DOCUMENTS

| | | | | |
|---|---|---|---|---|
| 3,443,814 A | * | 5/1969 | Dahlheimer | F16J 15/48 277/552 |
| 4,421,326 A | * | 12/1983 | Drygalski | F16J 15/164 277/552 |
| 4,936,591 A | * | 6/1990 | Romero | F16J 15/3256 277/573 |
| 5,015,001 A | * | 5/1991 | Jay | F16J 15/3256 277/933 |
| 5,398,942 A | * | 3/1995 | Duckwall | F16J 15/3276 277/565 |
| 6,357,757 B1 | * | 3/2002 | Hibbler | F16J 15/3268 277/560 |
| 7,131,648 B2 | * | 11/2006 | Peterson, Jr. | F16C 33/78 277/553 |
| 8,016,293 B2 | * | 9/2011 | Voydatch | F16J 15/164 277/572 |
| 8,534,674 B2 | * | 9/2013 | Maskaliunas | F16J 15/3208 277/551 |

(Continued)

FOREIGN PATENT DOCUMENTS

JP     7465632 B2     4/2024

*Primary Examiner* — Nathan Cumar
(74) *Attorney, Agent, or Firm* — J-TEK LAW PLLC; Scott T. Wakeman; Mark A. Ussai (57) ABSTRACT

A wheel end assembly includes a seal for sealing the annular space between an inner member and an outer member, one of which is a static component and the other a rotatable component. The seal includes an annular case having a cylindrical portion engaged with the static component and an annular flange portion extending radially from the cylindrical portion so as to be oriented vertically with respect to the horizontal central axis. An annular seal member is attached to the flange portion of the case and has at least one sealing lip engaged with the rotatable component so as to separate the annular space into a first chamber and a second chamber. Further, at least one air vent hole extends axially through the flange portion of the case so as to fluidly connect the first chamber with the second chamber.

21 Claims, 6 Drawing Sheets

(56) References Cited

U.S. PATENT DOCUMENTS

| | | | |
|---|---|---|---|
| 9,995,396 B1* | 6/2018 | Maskaliunas | F16J 15/3268 |
| 2012/0126490 A1* | 5/2012 | Maskaliunas | F16J 15/48 |
| | | | 277/572 |
| 2013/0119611 A1* | 5/2013 | Kofler | F16J 15/48 |
| | | | 277/353 |
| 2018/0163872 A1* | 6/2018 | Maskaliunas | F16J 15/002 |
| 2022/0316595 A1* | 10/2022 | Pecak | F16J 15/3264 |

* cited by examiner

SEAL WITH AXIAL AIR VENTS

BACKGROUND OF THE INVENTION

The present invention relates to seals, and more particularly to seals for vehicle wheel end assemblies.

Wheel end assemblies are well known and typically include an inner component, such as a shaft or axle, and an outer component, typically a hub or housing, one component being connected to a wheel and rotatable relative to the other, non-rotatable or "static" component. The inner shaft/axle and the outer hub/housing are rotatably coupled by one or more bearings. In order to retain lubricant within the bearing(s) and prevent entry of contaminants, a seal is mounted adjacent to at least one and typically both axial ends of the bearing. Such seals generally include a case coupled with either the inner or outer component and a seal member attached to the case and sealingly engaged with the other component.

SUMMARY OF THE INVENTION

In one aspect, the present invention is a wheel end assembly comprising an inner member having a central horizontal axis and an outer member disposed circumferentially about the inner member so as to define an annular space between the inner member and the outer member. One of the inner member and the outer member is a rotatable component configured to rotate about the central axis and the other one of the inner member and the outer member is a static component. A seal is provided for sealing the annular space and includes an annular case having a cylindrical portion engaged with the static component and an annular flange portion extending radially from the cylindrical portion so as to be oriented vertically with respect to the horizontal central axis. An annular seal member is attached to the flange portion of the case and has at least one sealing lip engaged with the rotatable component so as to separate the annular space into a first chamber and a second chamber. Further, at least one air vent hole extends axially through the flange portion of the case so as to fluidly connect the first chamber with the second chamber.

In a presently preferred application, the outer member is rotatable and the inner member is static or fixed with respect to the central axis. As such, the cylindrical portion of the seal case is engaged with the inner member and the flange portion of the case extends radially outwardly from the cylindrical portion. The at least one sealing lip of the seal member is engaged with the outer member.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "lower" and "upper" designate directions in the drawings to which reference is made and the words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Figure 1:
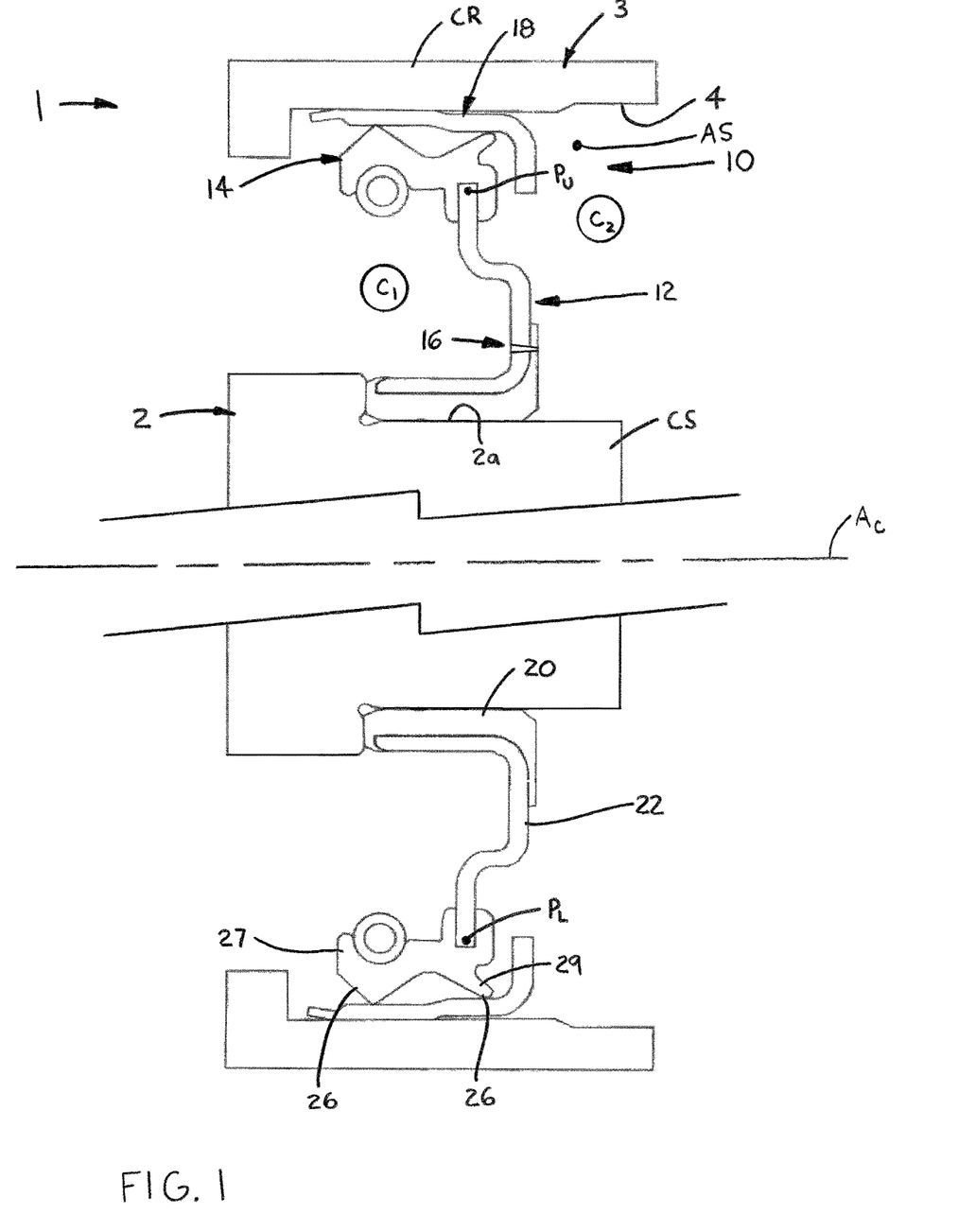
FIG. 1 is an axial cross-sectional view of a wheel end assembly in accordance with the present invention, shown in an outwardly-sealing configuration.
Figure 5:
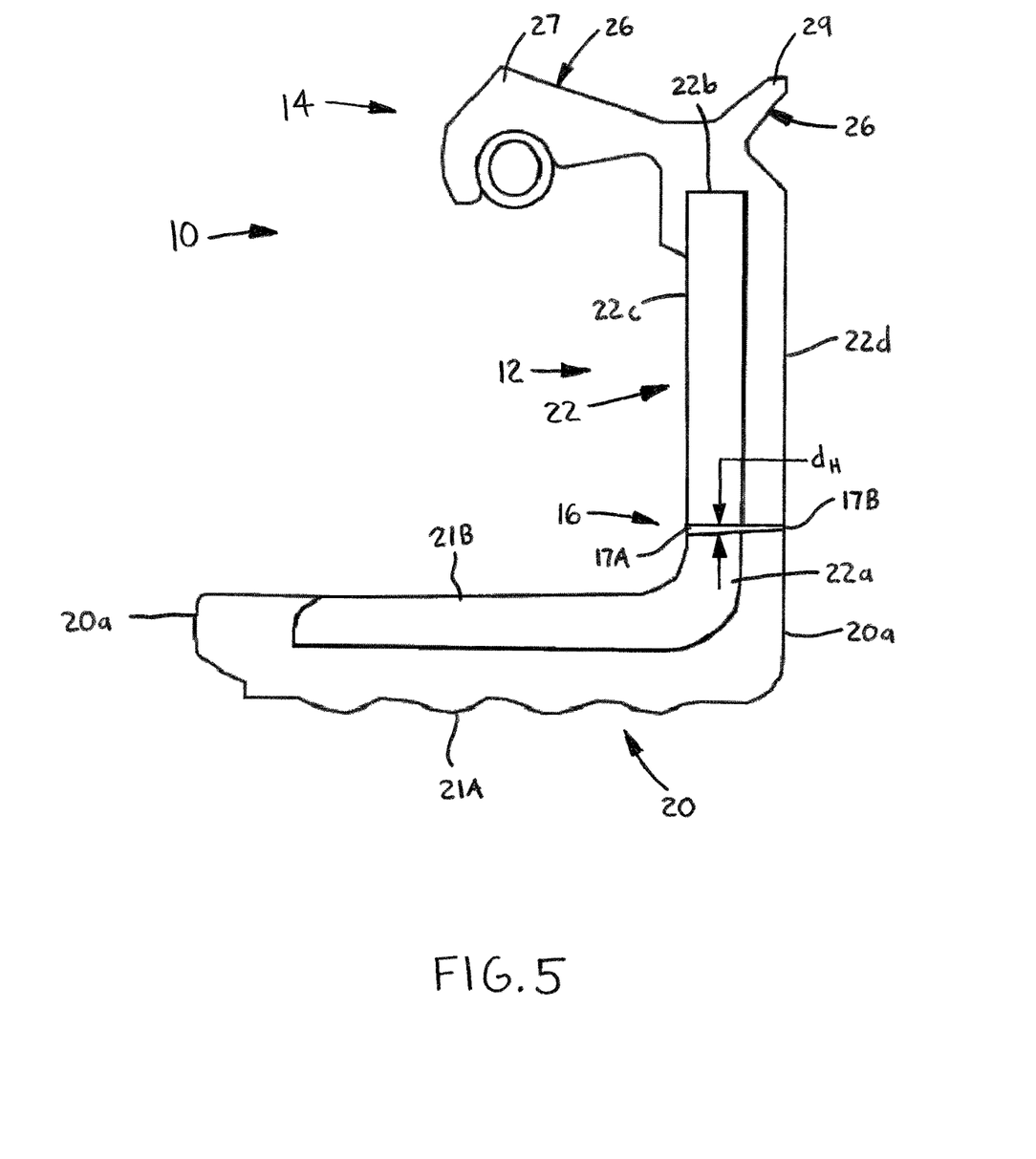
FIG. 5 an enlarged view of an alternative construction of the seal of the first configuration wheel end assembly.
Figure 6:
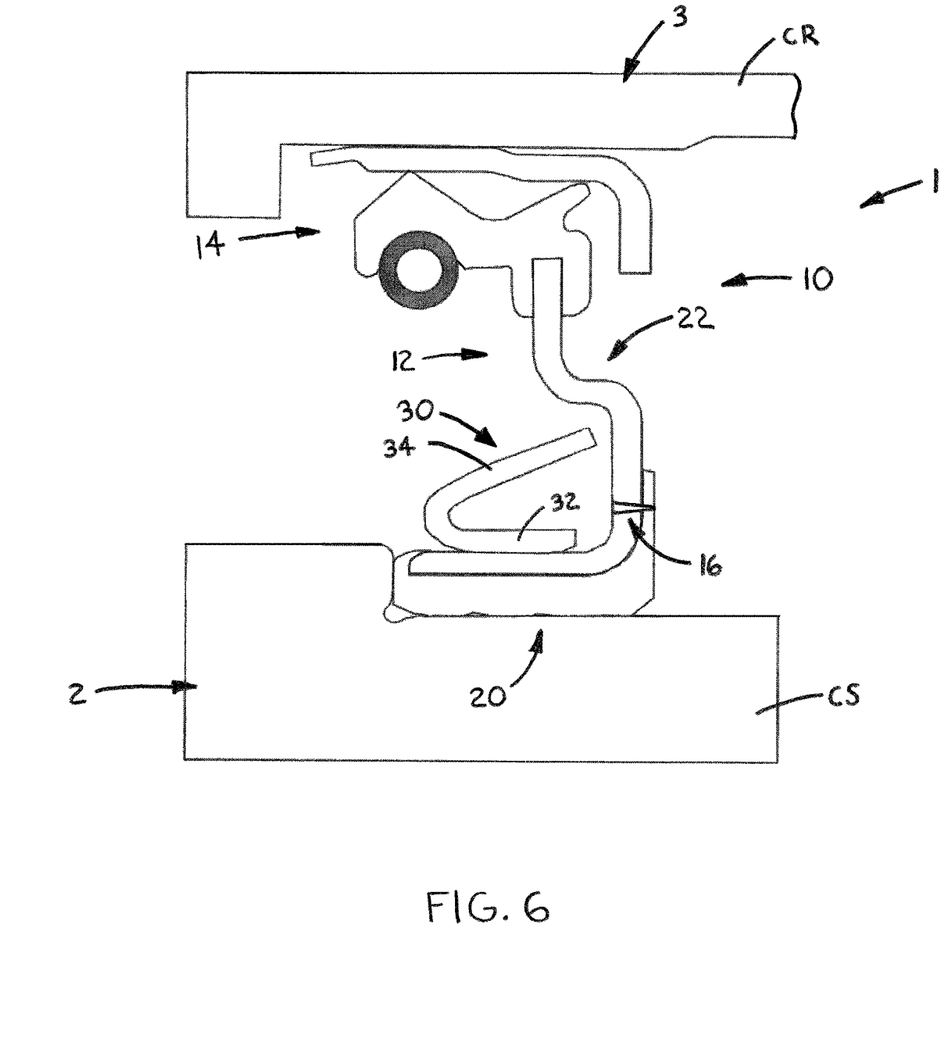
FIG. 6 is an enlarged, axial cross-sectional view of the first configuration wheel end assembly, shown with an optional shield member.
Figure 7:
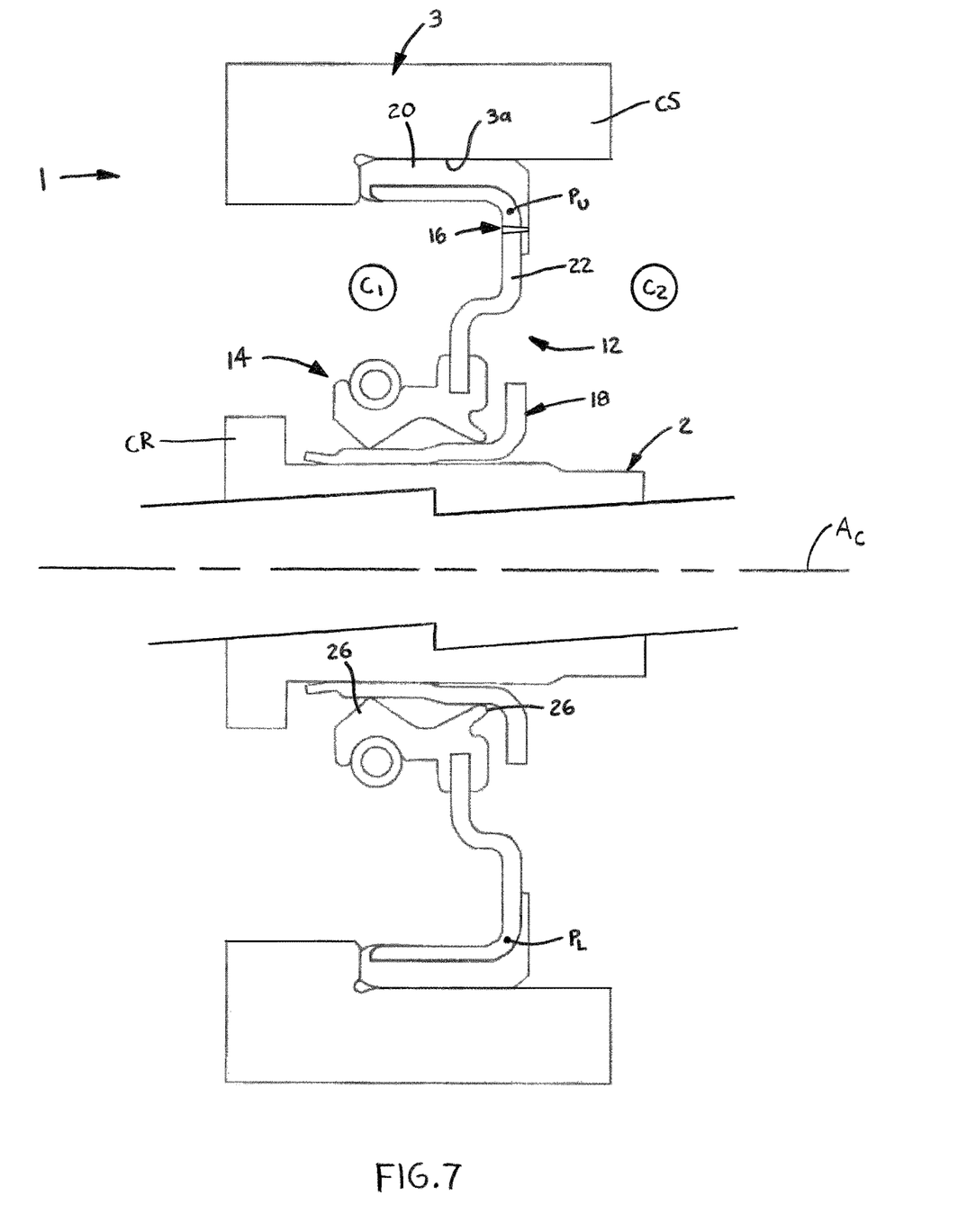
FIG. 7 is an axial cross-sectional view of the wheel end assembly of the present invention, shown in an inwardly-sealing configuration.

Referring now to the drawings in detail, wherein like numbers are used to indicate like elements throughout, there is shown in FIGS. 1-7 a seal 10 for a wheel end assembly 1 comprising an inner member 2, such as a shaft or an axle, and an outer member 3, for example a hub, a housing, etc. The inner member 2 has a central axis $A_C$ and the outer member 3 is disposed circumferentially about the inner member 2 so as to define an annular space AS (FIG. 1) between the inner and outer members 2, 3; specifically, the outer member 3 has a bore 4 and the inner member 2 is disposed centrally within the bore 4. One of the members 2, 3 is a rotatable component CR configured to rotate about the central axis $A_C$ and the other member 3, 2 is a static component CS fixed with respect to the central axis $A_C$, as indicated in FIGS. 1 and 7.

The seal 10 is provided for sealing the annular space AS and basically includes an annular case 12 engaged with the static component CS and an annular seal member 14 attached to the case 12. The seal member 14 is sealingly engaged with the rotatable component CR so as to separate the annular space AS into a first chamber $C_1$ containing lubricant and a second chamber $C_2$ open to the exterior environment, i.e., is fluidly connected with the exterior of the wheel end assembly 1. As discussed in detail below, the case 12 has at least one axial air vent hole 16 fluidly connecting the first and second chambers $C_1$, $C_2$, so as to thereby reduce air pressure within the first chamber $C_1$, and is located so as to prevent any potential lubricant flow between the chambers $C_1$, $C_2$ (i.e., through the hole 16). Further, the seal 10 also preferably includes an annular sleeve 18 mounted about or within the rotatable component CR, such that the seal member 14 directly engages with the sleeve 18 as discussed below.

Figure 2:
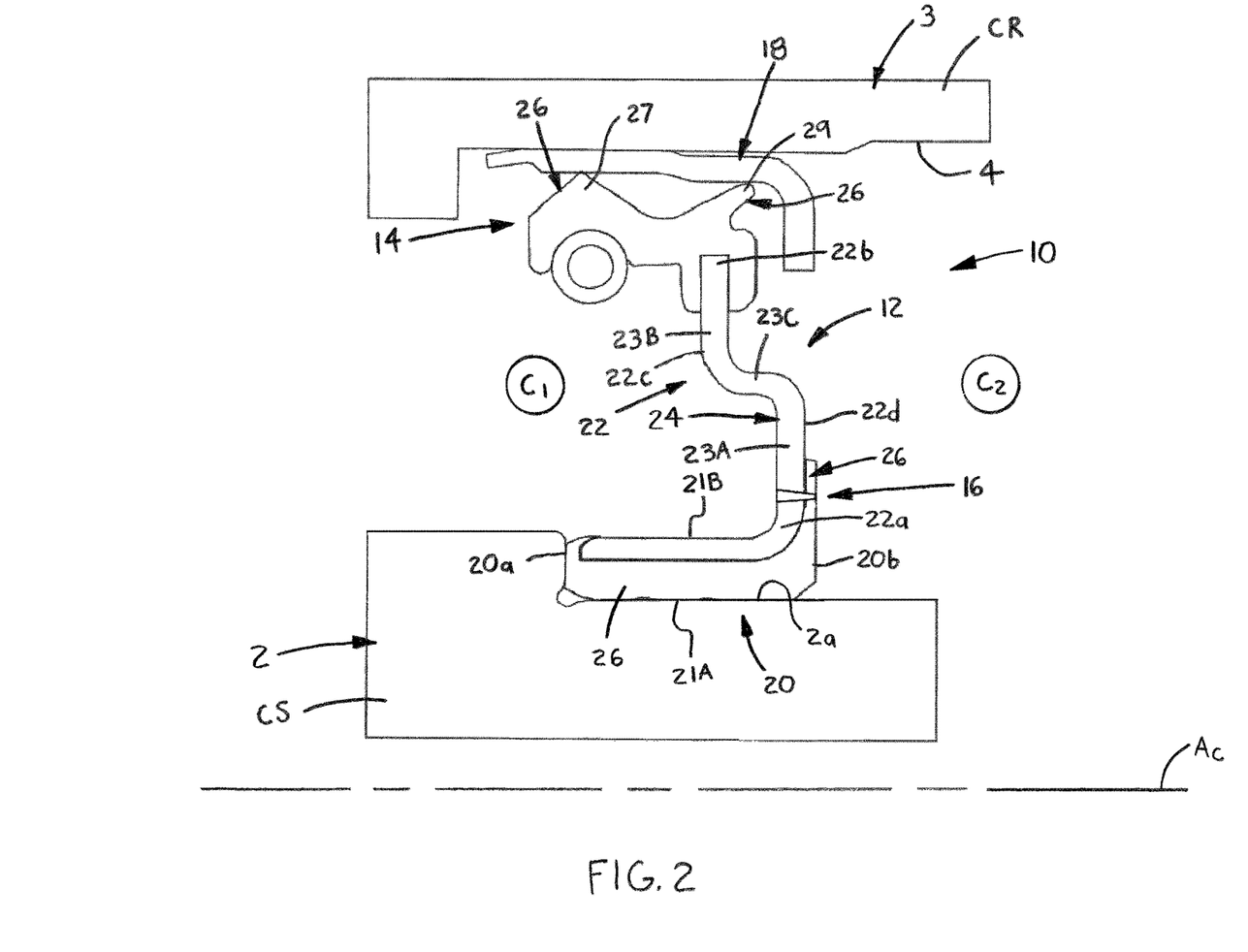
FIG. 2 is an enlarged, axial cross-sectional view of the upper portion of FIG. 1.

The annular case 12 includes a cylindrical portion 20 and an annular flange portion 22 extending radially from the cylindrical portion 20. More specifically, the cylindrical portion 20 has inner and outer circumferential surfaces 21A, 21B, respectively, and opposing first and second axial ends 20a, 20b, respectively. When the inner member 2 functions as the static member CS, the inner circumferential surface 21A of the cylindrical portion 20 is frictionally engaged with an outer circumferential surface 2a of the inner member 2, as indicated in FIG. 2. Alternatively, when the outer member 3 functions as the static component CS, the outer circumferential surface 21B is frictionally engaged with an inner circumferential surface 3a of the outer member 3, as shown in FIG. 7.

Figure 3:
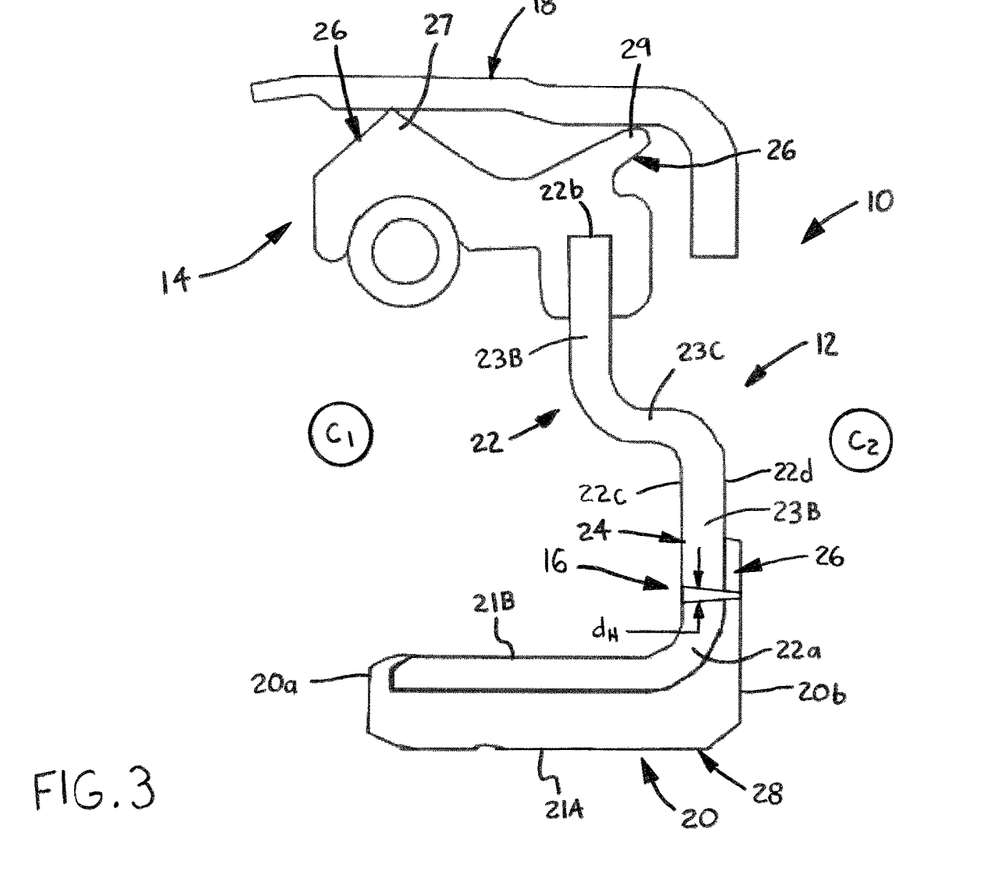
FIG. 3 is a more enlarged, broken-away view of the seal of the first configuration wheel end assembly.
Figure 4:
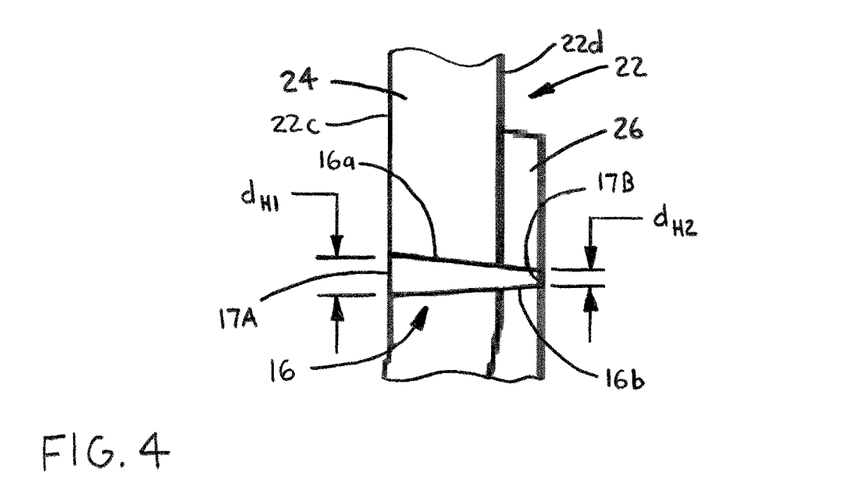
FIG. 4 is a greatly enlarged portion of FIG. 3.

In either case, the flange portion 22 has a first radial end 22a integrally formed with the second axial end 20b of the cylindrical portion 20, a second, free radial end 22b, and opposing first and second axial ends 22c, 22d, respectively. The first axial end 22c partially bounds the first chamber $C_1$ and the second axial end 22d partially bounds the second chamber $C_2$. The flange portion 22 may be entirely or substantially formed of a metallic material, such as low carbon steel or aluminum, but preferably includes both a metallic section 24 and an elastomeric section 26 attached to the metallic section 24, as indicated in FIGS. 3 and 4. The elastomeric section 26 of the flange portion 22 may be integrally formed with the seal member 14, as shown in FIG. 5, or may be provided by a separate sealing member 28 configured to seal between the cylindrical portion 20 of the case 12 and the static component CS, as depicted in FIGS. 1-4 and 6.

As shown in FIGS. 1-3, 6 and 7, the flange portion 22 is preferably formed with two radially extending sections 23A, 23B offset axially from each other and connected by an axial section 23C, as indicated in FIGS. 2 and 3. Alternatively, the flange portion 22 may be formed substantially "straight", i.e., extending entirely radially as shown in FIG. 5 or angled to extend both radially and axially (not shown). Further, the flange portion 22 may also be formed with three or more radial sections connected by axial sections, one or more curved sections, or formed in any other desired manner. With any flange structure, when the annular case 12 is engaged with the static component CS, the flange portion 22 is oriented vertically with respect to the horizontal central axis CS such that the flange portion 22 has a vertically uppermost point Pu and a vertically lowermost point $P_L$, as indicated in FIGS. 1 and 7.

Referring now to FIGS. 1-3 and 5-7, the annular seal member 14 is preferably formed of an elastomeric material, such as natural or synthetic rubber, polyurethane, etc., and is attached to the flange portion 22 of the case 12, specifically at least the second radial end 22b thereof. The seal member 14 has at least one sealing lip 26 engaged with the rotatable component CR, preferably at least one and most preferably two radial sealing lips 26, specifically a primary sealing lip 27 and a dust lip 29. The radial sealing lips 26 are either engaged with a circumferential surface of the rotatable component CR or a circumferential surface of a component disposed about or within the rotatable component CR, preferably the annular sleeve 18, as shown in FIGS. 1-3, 6 and 7. However, the seal member 14 may include any combination of radial and axial sealing lips or may even have only one or more axial sealing lips (no alternatives shown).

Furthermore, the at least one air vent hole 16 extends axially through the flange portion 22 of the case 12 so as to fluidly connect the first chamber $C_1$ with the second chamber $C_2$. Specifically, the at least one air vent hole 16 has an inlet opening 17A on the first axial end 22c of the flange portion 22 and an outlet opening 17B on the second axial end 22d of the flange portion 22. Thus, the seal 10 is configured to prevent lubricant flow between the first and second chambers $C_1$, $C_2$ and the air vent hole(s) 16 is/are configured to fluidly connect the first and second chambers $C_1$, $C_2$ so as to reduce air pressure within the first chamber $C_1$, specifically when air pressure in the first chamber $C_1$ is greater than ambient or external air pressure.

In order to prevent the chance of a clog or obstruction of a single vent hole 16 causing the first chamber $C_1$ to be gaseously isolated from the second chamber $C_2$, the at least one air vent hole 16 preferably includes a plurality of air vent holes 16. The plurality of vent holes 16 are preferably circumferentially spaced apart and each located vertically above the central axis $A_C$, as discussed in further detail below. The plurality of air vent holes 16 may be located on a common diameter or be diametrically staggered, or even located along a single radius so as to radially aligned, and thus not circumferentially spaced.

With any number and relative location of the vent holes 16, each air vent hole 16 preferably has a first axial section 16a extending through the metallic section 24 of the flange portion 22 and a second axial section 16b extending through the elastomeric section 26 of the flange portion 22, the second section 16b being aligned with the first section 16a, as indicated in FIG. 4. However, the vent hole(s) 16 may include only a single section extending through the flange metallic section 24 (structure not shown).

Further, in order to reduce the potential for lubricant transfer through the air vent hole(s) 16, the one or more holes 16 are preferably located vertically above the central axis $A_C$, most preferably proximal to (i.e., radially and angularly) the flange uppermost point Pu, and are each sized with a minimal diameter du that reduces the likelihood of lubricant passage therethrough. More specifically, each air vent hole 16 is preferably formed in the upper half of the case annular flange portion 22, i.e., a section of the flange portion 22 located above the central axis $A_C$, when the case 12 is engaged with the static component CS, and most preferably located within a thirty degree angular sector (not indicated) of the flange portion 22 centered about the flange uppermost point PU.

As lubricant in the wheel end assembly 1 tends to collect or "pool" below the central axis $A_C$ when the assembly 1 is in a static state, i.e., the rotatable component RS is not rotating, the location of the air vent holes 16 above the central axis $A_C$ minimizes the chance of lubricant even reaching, let alone passing through, the vent holes 16. However, although not preferred, the air vent hole(s) 16 may be formed in the "lower half" of the flange portion 22 below the central axis $A_C$, at least in flange sections more proximal to the axis $A_C$ than to the lowermost point $P_L$, when the lubricant pool has a minimal height in comparison to the diameter of the seal 10.

Further, each air vent hole 16 preferably has a diameter du with a value of no greater than fifty thousandths of a millimeter (0.050 mm) and preferably no greater than twenty-five thousandths of a millimeter (0.025 mm). Such minimal sizing of the diameter du of the air vent hole(s) 16 reduces the chance of any lubricant, which is relatively viscous, from passing through the hole 16. To further reduce the chance of lubricant migration, each hole 16 preferably tapers inwardly from the inlet opening 17A to the outlet opening 17B; specifically, the inlet opening 17A has a first diameter $d_{H1}$ and the outlet opening 17B has a second diameter $d_{H2}$, the second diameter $d_{H1}$ having a value less than the first diameter $d_{H1}$, as best shown in FIG. 4.

Referring particularly to FIG. 6, to further ensure that no lubricant reaches the one or more air vent holes 16, the case 12 preferably further includes a shield member 30 attached to the case cylindrical portion 20. The shield member 30 is spaced axially from the flange portion 22 so as to extend radially overlapping the at least one and preferably the plurality of air vent holes 16. Preferably, the shield 30 includes a cylindrical portion 32 attached to a circumferential surface of the case cylindrical portion and a flange portion 34 extending radially from the cylindrical portion 20 and angled axially toward the case radial flange portion 22 so as to radially overlap the vent hole(s) 16. The shield 30 may be arcuate and extend circumferentially only to an angular extent necessary to cover all of the air vent holes 16 or may be annular and extend circumferentially entirely about the central axis $A_C$. However, the shield 30 may have any other appropriate structure or the seal 10 may be provided without any type of shield.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A wheel end assembly comprising:
   an inner member having a central horizontal axis;
   an outer member disposed circumferentially about the inner member so as to define an annular space between the inner member and the outer member, one of the inner member and the outer member being a rotatable component configured to rotate about the central axis and the other one of the inner member and the outer member being a static component; and
   a seal for sealing the annular space and including:
      an annular case having a cylindrical portion engaged with the static component and an annular flange portion extending radially from the cylindrical portion so as to be oriented vertically with respect to the horizontal central axis;
      an annular seal member attached to the flange portion of the case and having at least one sealing lip engaged with the rotatable component so as to separate the annular space into a first chamber and a second chamber; and
      at least one air vent hole extending axially through the flange portion of the case so as to fluidly connect the first chamber with the second chamber, the at least one air vent hole being configured to allow air to flow between the first and second chambers while preventing lubricant flow between the first and second chambers.

2. The wheel end assembly as recited in claim 1, wherein the seal is configured to prevent lubricant flow between the first and second chambers and the at least one air vent hole is configured to fluidly connect the first and second chambers so as to reduce air pressure within the first chamber.

3. The wheel end assembly as recited in claim 1, wherein the case is positioned with respect to the static member such that the at least one air vent hole is located vertically above the central axis.

4. The wheel end assembly as recited in claim 3, wherein the flange portion has an uppermost point with respect to the central axis and the at least one air vent hole is located proximal to the uppermost point of the flange.

5. The wheel end assembly as recited in claim 1, wherein the at least one air vent hole has a diameter with a value of no greater than fifty thousandths of a millimeter.

6. The wheel end assembly as recited in claim 5, wherein the value of the diameter is no greater than twenty-five thousandths of a millimeter.

7. The wheel end assembly as recited in claim 1, wherein:
   the flange portion of the case has a first axial end partially bounding the first chamber and a second axial end partially bounding the second chamber; and
   the at least one air vent hole has an inlet opening on the first axial end of the flange portion and an outlet opening on the second axial end of the flange portion.

8. The wheel end assembly as recited in claim 7, wherein the inlet opening has a first diameter and the outlet opening has a second diameter, the second diameter having a value less than the first diameter and the at least one air vent hole tapers inwardly from the inlet opening to the outlet opening.

9. The wheel end assembly as recited in claim 1, wherein:
   the flange portion of the case has a metallic section and an elastomeric section attached to the metallic section; and
   the at least one air vent hole has a first axial section extending through the metallic section and a second axial section extending through the elastomeric section and aligned with the first section.

10. The wheel end assembly as recited in claim 9, wherein the elastomeric section of the flange portion of the case is integrally formed with the seal member.

11. The wheel end assembly as recited in claim 5, wherein the at least one air vent hole includes a plurality of air vent holes circumferentially spaced apart and each located vertically above the central axis.

12. The wheel end assembly as recited in claim 1, wherein the case further includes a shield member attached to the cylindrical portion and spaced axially from the flange portion so as to extend radially overlapping the at least one air vent hole.

13. The wheel end assembly as recited in claim 1, wherein the at least one sealing lip of the seal member is a radial sealing lip engaged with a circumferential surface of the rotatable component or a circumferential surface of a component disposed about or within the rotatable component.

14. The wheel end assembly as recited in claim 1, wherein one of:

the inner member is the static component, the flange portion of the case extends radially outwardly from the cylindrical portion of the case and the sealing lip of the seal member engages with an inner circumferential surface of the outer member; and the outer member is the static component, the flange portion of the case extends radially inwardly from the cylindrical portion of the case and the sealing lip of the seal member engages with an outer circumferential surface of the inner member.

15. A wheel end assembly comprising:

an inner member having a central horizontal axis;

an outer member disposed circumferentially about the inner member so as to define an annular space between the inner member and the outer member, the outer member being a rotatable component configured to rotate about the central axis; and a seal for sealing the annular space and including:
an annular case having a cylindrical portion engaged with the inner member and an annular flange portion extending radially outwardly from the cylindrical portion so as to be oriented vertically with respect to the horizontal central axis;

an annular seal member attached to the flange portion of the case and having at least one sealing lip engaged with the outer member so as to separate the annular space into a first chamber and a second chamber, the seal being configured to prevent lubricant flow between the first and second chambers; and at least one air vent hole extending axially through the flange portion of the case so as to fluidly connect the first chamber with the second chamber to reduce air pressure within the first chamber, the at least one air vent hole being configured to allow air to flow between the first and second chambers while preventing lubricant flow between the first and second chambers.

16. The wheel end assembly as recited in claim 15, wherein the case is positioned with respect to the static member such that the air vent hole is located vertically above the central axis.

17. The wheel end assembly as recited in claim 16, wherein the flange portion has an uppermost point with respect to the central axis and the at least one vent hole is located proximal to the uppermost point of the flange.

18. The wheel end assembly as recited in claim 15, wherein the at least one air vent hole has a diameter with a value of no greater than fifty thousandths of a millimeter.

19. The wheel end assembly as recited in claim 15, wherein:

the flange portion of the case has a first axial end partially bounding the first chamber and a second end partially bounding the second chamber; and the at least one air vent hole has an inlet opening on the first axial end of the flange portion and an outlet opening on the second axial end of the flange portion.

20. The wheel end assembly as recited in claim 19, wherein at least one of:

the inlet opening has a first diameter and the outlet opening has a second diameter, the second diameter having a value less than the first diameter and the at least one air vent hole tapers inwardly from the inlet opening to the outlet opening;

the flange portion of the case has a metallic section and an elastomeric section attached to the metallic section and the at least one air vent hole has a first axial section extending through the metallic section and a second axial section extending through the elastomeric section and aligned with the first section; and the at least one air vent hole includes a plurality of air vent holes circumferentially spaced apart and each located vertically above the central axis.

21. A wheel end assembly comprising:

an inner member having a central horizontal axis;

an outer member disposed circumferentially about the inner member so as to define an annular space between the inner member and the outer member, one of the inner member and the outer member being a rotatable component configured to rotate about the central axis and the other one of the inner member and the outer member being a static component; and a seal for sealing the annular space and including:
an annular case having a cylindrical portion engaged with the static component and an annular flange portion extending radially from the cylindrical portion so as to be oriented vertically with respect to the horizontal central axis;

an annular seal member attached to the flange portion of the case and having at least one sealing lip engaged with the rotatable component so as to separate the annular space into a first chamber and a second chamber; and at least one air vent hole extending axially through the flange portion of the case so as to fluidly connect the first chamber with the second chamber;

wherein the flange portion of the case has a first axial end partially bounding the first chamber and a second axial end partially bounding the second chamber and the at least one air vent hole has an inlet opening on the first axial end of the flange portion and an outlet opening on the second axial end of the flange portion; and wherein the inlet opening has a first diameter and the outlet opening has a second diameter, the second diameter having a value less than the first diameter and the at least one air vent hole tapers inwardly from the inlet opening to the outlet opening.

* * * * *